United States Patent
Hodin et al.

(10) Patent No.: US 7,400,138 B2
(45) Date of Patent: Jul. 15, 2008

(54) CONTINUOUSLY DETECTING THE POSITION OF A MOVING ELEMENT IN A TRANSMISSION RATIO CHANGER SYSTEM

(75) Inventors: Guillaume Hodin, Cluses (FR); Stephane Rosson, Marnaz (FR); Jean-Pierre Baz, Passy (FR)

(73) Assignee: Teleflex Automotive France SA (FR)

( * ) Notice: Subject to any disclaimer, the term of this patent is extended or adjusted under 35 U.S.C. 154(b) by 0 days.

(21) Appl. No.: 11/674,856

(22) Filed: Feb. 14, 2007

(65) Prior Publication Data
US 2007/0188164 A1 Aug. 16, 2007

(30) Foreign Application Priority Data
Feb. 14, 2006 (FR) .................................. 06 01291

(51) Int. Cl.
*G01B 7/30* (2006.01)
*G01R 33/02* (2006.01)
*G01R 33/09* (2006.01)

(52) U.S. Cl. ............................. 324/207.23; 324/207.21; 324/207.24; 324/207.25; 324/252

(58) Field of Classification Search ................................ 324/207.23–207.26, 173–174, 207.21, 252; 73/514.31, 514.39, 514.16; 340/671–672
See application file for complete search history.

(56) References Cited

U.S. PATENT DOCUMENTS 6,057,682 A 5/2000 McCurley et al.
6,288,533 B1 9/2001 Haeberli et al.

FOREIGN PATENT DOCUMENTS

| EP | 0 800 055 | 10/1997 |
| WO | WO 02/43045 | 5/2002 |
| WO | WO 03/008911 | 1/2003 |

*Primary Examiner*—Bot LeDynh
(74) *Attorney, Agent, or Firm*—Alston & Bird LLP

(57) ABSTRACT

A device for detecting the linear and angular positions of a moving element such as a gearchange finger in a motor vehicle gearbox, the moving element carrying at least one permanent magnet that is movable past a printed circuit card mounted on a stationary support and carrying magnetoresistance cells. The invention enables the transmission ratio engaged in a gearbox to be detected continuously.

15 Claims, 2 Drawing Sheets

CONTINUOUSLY DETECTING THE POSITION OF A MOVING ELEMENT IN A TRANSMISSION RATIO CHANGER SYSTEM

The invention relates to a device for continuously detecting the linear and angular positions of a moving element in a transmission ratio changer system, in particular for a motor vehicle.

BACKGROUND OF THE INVENTION

Devices are known that are capable of detecting the presence of the moving element in a gearchanger system in one or another of its predetermined positions corresponding to selecting and changing gear, for example in systems of the clutch-by-wire type in which a clutch is controlled by an actuator, itself controlled by data processor means on the basis of detecting positions in which a gearchange lever is placed by the driver of the vehicle.

Nevertheless, those prior art devices are not capable, in general, of continuously detecting the transmission ratio that is engaged in the vehicle gearbox, even though such information could be used for various purposes by computer processor means, e.g. for reducing fuel consumption and/or the emission of polluting compounds into the atmosphere, or even for preventing starting the engine when a gear is engaged.

It is also important for this information to be obtained using a minimum number of detector components and in a manner that is as inexpensive as possible.

OBJECT AND SUMMARY OF THE INVENTION

For this purpose, the invention provides a device for continuously detecting the linear and angular positions of a moving element in a system for changing a transmission ratio, in particular for a motor vehicle, the device comprising at least one permanent magnet mounted on the moving element, and at least one printed circuit carrying magnetoresistance cells detecting the directions of the magnetic field lines of said permanent magnet, the printed circuit being mounted on a stationary support facing the path traveled by the permanent magnet during displacement of the moving element in translation and in rotation in order to change a transmission ratio, the outputs of the magnetoresistance cells being connected to a processor circuit in order to determine the position of the moving element by triangulation from the directions of the magnetic field lines detected by the cells.

Thus, according to the invention, in order to obtain information continuously concerning the position of the moving element, it suffices to mount a permanent magnet on a moving element in a gearchanger system and to place a printed circuit on a stationary support, the printed circuit carrying magnetoresistance cells facing the path traveled by the permanent magnet. By using magnetoresistance cells, the information is obtained reliably, since the cells enable the position of the moving element to be detected accurately without making contact therewith.

Advantageously, the magnetoresistance cells are all mounted on a single printed circuit.

The circuit may include at least three magnetoresistance cells, and it preferably has four cells, e.g. located at the corners of a square or of a rectangle so as to detect the position of the permanent magnet in reliable manner and so as to benefit from information redundancy, thereby improving the reliability of information that is detected.

When the stroke of the permanent magnet is relatively long, the printed circuit may have a larger number of cells, for example five cells disposed in a cross.

In a preferred embodiment of the invention, the moving element of the transmission ratio changer system is a gearchange finger mounted in an outlet module of a gearbox.

In another embodiment, the moving element is a gearchange lever.

In a variant embodiment of the invention, the device comprises two permanent magnets that are carried by the moving element and that are separated from each other by magnetic shielding, the magnetic axes of the magnets being perpendicular, the device further comprising two perpendicular printed circuits carrying magnetoresistance cells that are distributed along the paths traveled by the two magnets when the moving element is moved in rotation and in translation in order to change a transmission ratio.

The above-mentioned magnetic shielding that separates the two magnets extends between each magnet and the magnetoresistance cells for detecting the position of the other magnet.

BRIEF DESCRIPTION OF THE DRAWINGS

The invention can be better understood, and other characteristics, details, and advantages thereof appear more clearly on reading the following description made by way of example and with reference to the accompanying drawings, in which.

MORE DETAILED DESCRIPTION

Figure 1:
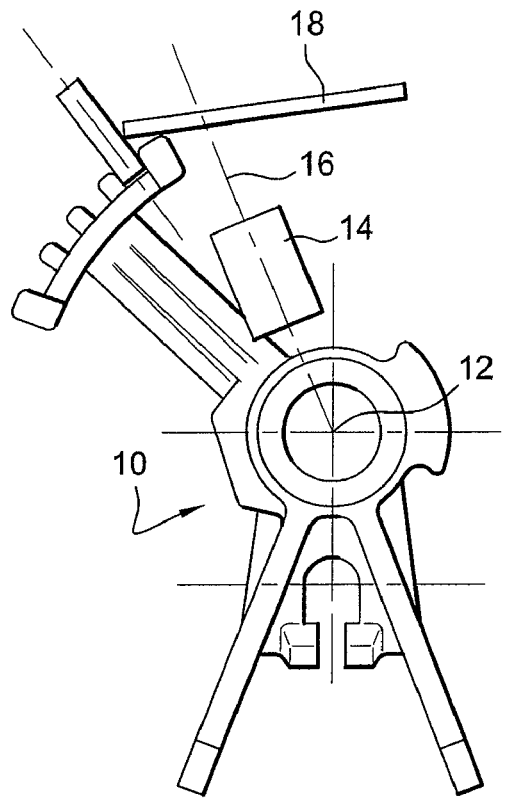
FIG. 1 is a diagram showing a gearchange finger of a motor vehicle gearbox, the finger being fitted with a permanent magnet.

In a manner well known to the person skilled in the art, a gearchange finger in a gearbox, such as the finger shown at 10 in FIG. 1, forms part of a mechanism for selecting and changing gear, and it serves to move forks that drive synchronizers fitted to the jaw-clutch means of the gearbox, the gearchange finger being movable in rotation about its axis 12 and in translation along said axis in order to engage one or the other of the gearengagement forks.

According to the invention, this gearchange finger carries a permanent magnet 14, which in this example is cylindrical in shape, having its magnetic axis 16 oriented radially relative to the gearchange finger 10, i.e. intersecting the axis of rotation 12 of said gearchange finger.

Figure 2:
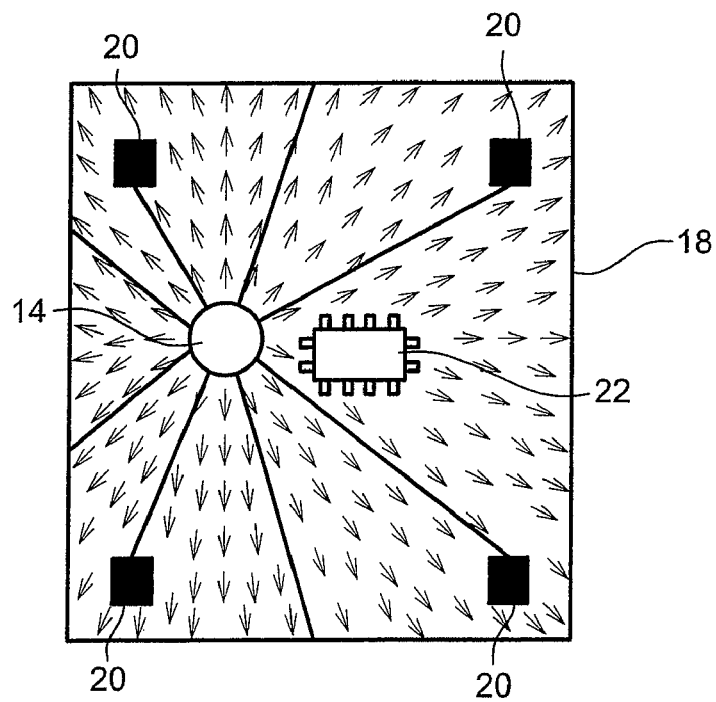
FIG. 2 is a diagram showing the principle of the device of invention.

The permanent magnet 14 carried by the gearchange finger moves facing a printed circuit board 18 that is carried by a stationary support, for example by the housing of the outlet module of the gearbox in which the gearchange finger 10 is mounted, said printed circuit board 18 carrying magnetoresistance cells 20 having their outputs connected to the inputs of a microprocessor 22 that is mounted on the printed circuit board 18 in the example of FIG. 2, but that, in a variant, could be remote and constituted by the microprocessor of the computer controlling the gearbox.

The number of cells 20 is at least three in order to be able to detect the position of the permanent magnet 14 by triangulation when the magnet is moved relative to the surface of the printed circuit board 18, which board extends substantially perpendicularly to the magnetic axis of the permanent magnet.

In known manner, each magnetoresistance cell 20 comprises an electric circuit made up of four resistors connected in a bridge, having two opposite terminals connected to direct current (DC) power supply means, and with the output signal being taken from the other two terminals of the bridge, which signal corresponds to a potential difference.

The four resistors are made of a conductive alloy that presents electrical resistance that is variable in the presence of a magnetic field. Above a threshold of magnetic field saturation, the variation in the resistance of each resistor depends directly on the angle between the direction current flows through the resistor and the direction of the magnetic excitation.

Magnetoresistance cells present a certain number of advantages, such as being insensitive to the temperature coefficients of the permanent magnets, to dispersions in magnet characteristics, to shocks and vibration, or to variations in ambient temperature, being capable of accepting relatively large mechanical tolerances, being suitable for use with inexpensive magnets, and directly measuring the angle of the displacement of the permanent magnet.

Figure 3:
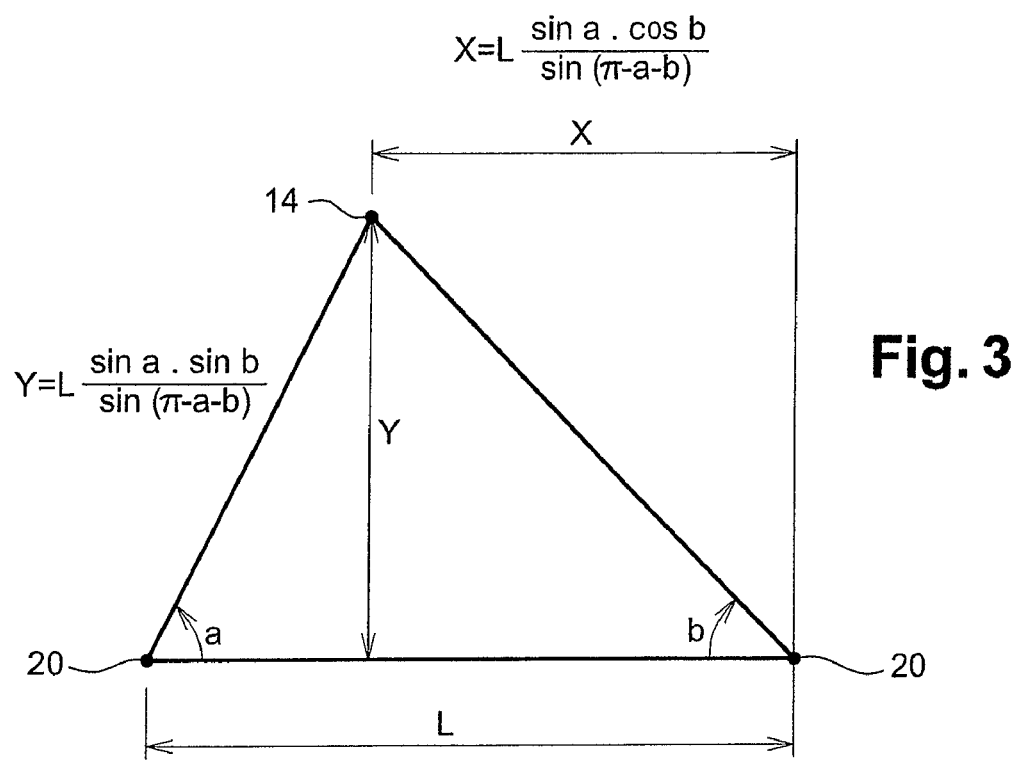
FIG. 3 shows the position of the magnet being determined by triangulation.

FIG. 3 shows the principle on which the position of the permanent magnet 14 is determined by triangulation using two magnetoresistance cells 20. The positions of the cells 20 are known, and their output signals constitute measurements of angles a, b formed between the direction of the magnetic excitation of the permanent magnet 14 and the reference axis passing through the location of each cell.

Knowing the angles a, b and the positions of the cells 20, makes it possible to determine the co-ordinates of the permanent magnet 14 in the plane of the printed circuit board 18, using formulae which are shown in FIG. 3.

In order to be able to determine the position of the permanent magnet 14, the magnet must not overlie the straight line passing between the two cells. The non-aligned disposition of the three cells 20 on the board 18 thus makes it possible to determine the position of the magnet 14 regardless of its position relative to the board 18.

Placing four cells 20 on the board 18, at the four corners of the board, improves this detection and makes it possible to have redundancy in terms of position detection.

As can be seen clearly in FIG. 2, were the magnetic field lines of the magnet are represented diagrammatically by arrows, any displacement of the magnet 14 in rotation about the axis 12 or in translation of long said axis leads to a change in the angles formed by said field lines relative to the axes passing through the cells 20 taken in pairs, and thus to changes in the output signals from the cells 20.

In an embodiment, the magnetoresistance cells 20 are disposed at the four corners of a square having a side of 25 millimeters (mm). The cylindrical magnet 14 is polarized along its axis and oriented substantially perpendicularly to the printed circuit board 18 carrying the cells, which board lies at about 15 mm from the end of the magnet. This disposition serves to provide a magnetic field that is symmetrical in the plane of the magnetoresistances. The magnet is of the neodymium-iron-boron type, its dimensions in terms of diameter and height are about 8 mm to 9 mm, and its remanent induction is about 1.4 teslas (T). The magnetoresistances of the cells 20 are then saturated by parallel induction of about 8 milliteslas (mT). The angular and axial positions of the permanent magnet 14 are determined with error of less than 1.5%.

Figure 4:
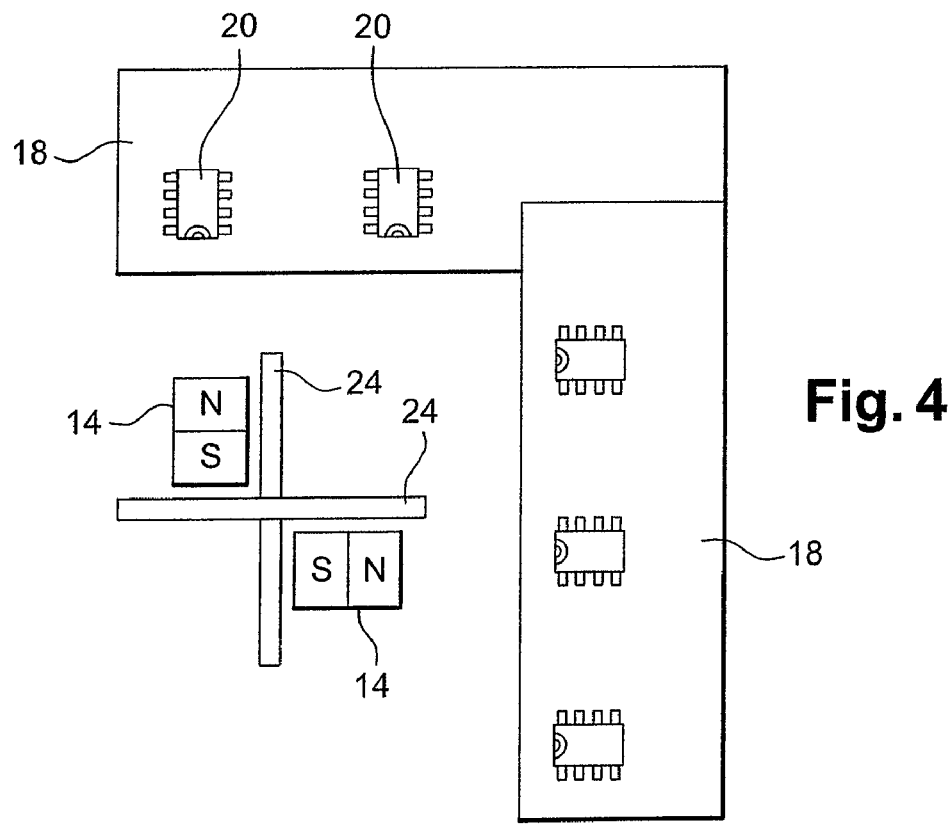
FIG. 4 is a diagram showing a variant embodiment of the invention.

A variant embodiment of the invention is shown diagrammatically in FIG. 4, in which the gearchange finger 10 is fitted with two permanent magnets 14 polarized axially and oriented perpendicularly to each other, these two magnets 14 moving past two printed circuit boards 18 disposed perpendicularly to each other and carrying magnetoresistance cells 20.

The disposition of the board 18 and of the cells 20 relative to the permanent magnets 14 and to the paths followed by the magnets during movement of the gearchange finger in rotation and in translation are such that each magnet 18 moves past a line of cells 20 carried by a board 18.

In order to avoid any problem of crosstalk between the cells in the magnets, i.e. in order to avoid one magnet influencing magnetically the cells 20 that are associated with the path of the other magnet, the two magnets are separated from each other by magnetic shielding formed by two plates 24 placed in a cross, the two magnets occupying two opposite quadrants of the cross formed by the two plates, and each plate lying between one permanent magnet 14 and the cells 20 associated with the other permanent magnet 14.

Detecting the position of the gearchange finger 10 continuously makes it possible to detect continuously the transmission ratio that is engaged or selected in the gearbox, and to use this information in order to reduce the fuel consumption of the motor vehicle and its emission of polluting compounds into the atmosphere (in particular carbon dioxide and nitrogen oxides). This information can also be used in stop-and-go type devices that stop the vehicle engine automatically when the vehicle is stationary, and that restart the engine automatically when the driver presses on the accelerator pedal or releases the brake pedal, for example.

The invention is also applicable to continuously detecting the position of a gearchange lever.

What is claimed is:

1. A device for continuously detecting the linear and angular positions of a moving element in a system for changing a transmission ratio, in particular for a motor vehicle, the device comprising at least one permanent magnet mounted on the moving element, and at least one printed circuit carrying at least three magnetoresistance cells detecting the directions of the magnetic field lines of said permanent magnet, the printed circuit being mounted on a stationary support facing the path traveled by the permanent magnet during displacement of the moving element in translation and in rotation in order to change a transmission ratio, the outputs of the magneto-resistance cells being connected to a processor circuit in order to determine the position of the moving element by triangulation from the directions of the magnetic field lines detected by the cells.

2. A device according to claim 1, wherein the cells are mounted on a single printed circuit.

3. A device according to claim 2, wherein the printed circuit carries at least four magnetoresistance cells, disposed at the four corners of a square or of a rectangle.

4. A device according to claim 1, wherein the permanent magnet is a cylindrical element polarized axially, having its axis substantially perpendicular to the printed circuit carrying the magnetoresistance cells.

5. A device for continuously detecting the linear and angular positions of a moving element in a system for changing a transmission ratio, in particular for a motor vehicle, the device comprising at least one permanent magnet mounted on the moving element, and at least one printed circuit carrying magnetoresistance cells detecting the directions of the magnetic field lines of said permanent magnet, the printed circuit being mounted on a stationary support facing the path traveled by the permanent magnet during displacement of the moving element in translation and in rotation in order to change a transmission ratio, the outputs of the magnetoresistance cells being connected to a processor circuit in order to determine the position of the moving element by triangulation from the directions of the magnetic field lines detected by the cells, wherein the angular travel of the magnet is about 25° and its stroke in translation is about 25 mm.

6. A device for continuously detecting the linear and angular positions of a moving element in a system for changing a transmission ratio, in particular for a motor vehicle, the device comprising two permanent magnets mounted on the moving element and separated from each other by magnetic shielding and having magnetic axes that are substantially perpendicular, together with two perpendicular printed circuits carrying the magnetoresistance cells, the printed circuits being mounted on a stationary support and distributed along the paths traveled by the two magnets when the moving element is displaced in rotation and/or in translation in order to change a transmission ratio, the outputs of the magnetoresistance cells being connected to a processor circuit in order to determine the position of the moving element by triangulation from the directions of the magnetic field lines detected by the cells.

7. A device according to claim 6, wherein the magnetic shielding separating the two magnets extends between each magnet and the cells for detecting the position of the other magnet.

8. A device according to claim 1, wherein the processor circuit to which the outputs of the cells are connected is itself mounted on the printed circuit or one of the printed circuits carrying the cells.

9. A device according to claim 1, wherein the moving element carrying the permanent magnet(s) is a gearchange finger mounted in an outlet module of a gearbox.

10. A device according to claim 5, wherein the permanent magnet is a cylindrical element polarized axially, having its axis substantially perpendicular to the printed circuit carrying the magnetoresistance cells.

11. A device according to claim 5, wherein the processor circuit to which the outputs of the cells are connected is itself mounted on the printed circuit or one of the printed circuits carrying the cells.

12. A device according to claim 5, wherein the moving element carrying the permanent magnet(s) is a gearchange finger mounted in an outlet module of a gearbox.

13. A device according to claim 6, wherein the permanent magnets are cylindrical elements polarized axially, each having its axis substantially perpendicular to the printed circuit carrying the magnetoresistance cells.

14. A device according to claim 6, wherein the processor circuit to which the outputs of the cells are connected is itself mounted on one of the printed circuits carrying the cells.

15. A device according to claim 6, wherein the moving element carrying the permanent magnet(s) is a gearchange finger mounted in an outlet module of a gearbox.

\* \* \* \* \*